United States Patent [19]
de Pous

[11] 4,368,143
[45] Jan. 11, 1983

[54] COMPOSITION FOR THE STORAGE OF HYDROGEN AND METHOD OF MAKING THE COMPOSITION

[75] Inventor: Olivier de Pous, Geneva, Switzerland

[73] Assignee: Battelle Memorial Institute, Carouge, Switzerland

[21] Appl. No.: 92,657

[22] Filed: Nov. 9, 1979

[30] Foreign Application Priority Data

Nov. 14, 1978 [CH] Switzerland ............ 11673/78

[51] Int. Cl.³ .......................................... C01B 6/24
[52] U.S. Cl. .......................... 252/457; 252/463; 252/468; 252/471; 252/473; 252/475; 423/648 R
[58] Field of Search ............ 423/644, 648 R; 252/471, 473, 475, 463, 468; 106/286.6, 290

[56] References Cited

U.S. PATENT DOCUMENTS

| | | | |
|---|---|---|---|
| 1,569,484 | 1/1926 | Hall | 106/290 |
| 4,195,989 | 4/1980 | Gamo et al. | 423/644 |
| 4,200,623 | 4/1980 | Muller et al. | 423/648 R |
| 4,200,624 | 4/1980 | Muller et al. | 423/648 R |

FOREIGN PATENT DOCUMENTS

226286 12/1924 United Kingdom ............ 106/290

OTHER PUBLICATIONS

Libowitz, "Metal Hydrides for Thermal Energy Storage", Proc. of the 9th Carter-Society Energy Conversion Conference (Aug. 1974), pp. 322-325.

*Primary Examiner*—O. R. Vertiz
*Assistant Examiner*—Wayne A. Langel
*Attorney, Agent, or Firm*—Karl F. Ross

[57] ABSTRACT

A magnesium powder composition for the reversible storage of hydrogen by absorption thereof in the magnesium to form the hydride which consists of an intimate mixture of magnesium powder and an inert powder which is stable under the conditions of formation and decomposition of the hydride. The stable inert powder, which prevents the agglomeration of the magnesium powder and maintains its hydrogen-storage capacity, is selected from the group which consists of metal powders such as manganese, iron, cobalt, nickel and copper, metal alloy powders such as iron-zinc alloys, and the oxides, carbides or nitrides of magnesium, calcium, boron, aluminum, silicon, titanium, zinc, vanadium, chromium, manganese and iron. The mixture is formed by intimately grinding the magnesium and inert powders together.

9 Claims, 6 Drawing Figures

COMPOSITION FOR THE STORAGE OF HYDROGEN AND METHOD OF MAKING THE COMPOSITION

FIELD OF THE INVENTION

The present invention relates to the storage of hydrogen as an interstitial and/or stoichiometric hydride of magnesium and, more particularly, to an improved magnesium-based composition for the storage of hydrogen and to a method of making this composition and a method for storing hydrogen utilizing this composition.

BACKGROUND OF THE INVENTION

In recent years, the storage of hydrogen as a potential fuel or reactant, has become of increasing interest and numerous systems have been described whereby hydrogen can be stored as an interstitial hydride or stoichiometric compound of an appropriate metal, to be released as required, the storage systems being reversible.

One of these systems utilizes magnesium (Mg) which can form the hydride ($MgH_2$) from which hydrogen can be driven in gaseous form. A storage system based upon the reversible reaction $H_2 + Mg = MgH_2$ is thus capable of storing hydrogen from a gaseous state upon contact of the hydrogen with the metal and of releasing hydrogen in a gaseous form at a subsequent time and, if desired, at a different place.

While a number of other materials have also been proposed for the storage of hydrogen in the form of respective hydrides, magnesium has been found to be of interest because of its relatively low cost and light weight which allows for a theoretical capacity of 7.6% by weight of hydrogen (based upon the weight of metal) to be stored and regenerated.

The storage of hydrogen in the form of magnesium hydride is described, for example, in French Pat. No. 1,529,371 and British Pat. No. 1,171,364.

The use of the $Mg/MgH_2$ system for the reversible storage of hydrogen on an industrial scale, however, poses several practical problems.

For example, the magnesium should be in the form of a powder so as to obtain the maximum specific surface area for hydrogen absorption and hence for the conversion of the Mg to $MgH_2$ under acceptable conditions.

Magnesium powder produced by thermal decomposition has a conversion ratio of $MgH_2/Mg$ greater than 0.9. The hydride can be produced initially by permitting the magnesium to absorb hydrogen at a temperature of 327° C. at a pressure of 2.3 bar for a period of 6 hours. However the cost of the $MgH_2$ prepared by indirect techniques is too high to permit economical use of the magnesium powder thus obtained for the storage of hydrogen in the form of a hydride by most economic criteria.

Furthermore, efforts to use magnesium turnings, instead of magnesium powder, for the storage of hydrogen have required conditions so extreme as to render the system impractical notwithstanding the lower cost of the starting material. For example, fine magnesium turnings must be maintained for several days at a temperature of 400° to 450° C. at a pressure of 70 bar in a hydrogen atmosphere for a molar conversion ratio $MgH_2/Mg$ of 0.9. These absorption conditions cannot be readily realized without special equipment and make the storage of hydrogen on an industrial scale impractical wherever these conditions must be observed.

Finally it is a practical necessity to provide conditions which can be generated conveniently and economically for absorption and desorption of hydrogen and yet provide a conversion ratio of $MgH_2/Mg$ which is as high as possible to obtain best utilization of magnesium. In other words this molar ratio should be as high as possible, the duration required for absorption and desorption should be as low as possible and both the absorption temperature and absorption pressure should be kept as low as possible.

It has been proposed to reduce the absorption temperature, the absorption pressure and the duration required for complete hydrogenation of magnesium by providing the magnesium in the form of an alloy with copper or nickel, namely, intermetallic compounds such as $Mg_2Cu$ and $Mg_2Ni$. The advantages of these materials is that they allow practically complete transformation of magnesium to $MgH_2$ at a temperature of 200° C. and 300° C. with a hydrogen pressure of 15 bar.

The state of the art relating to the storage of hydrogen in magnesium alloys is illustrated by the following works and publications:

D. L. Douglas: *The Storage and Release of Hydrogen From Magnesium Alloy Hydrides for Vehicular Applications*, International Symposium on Hydrides for Energy Storage, Norway, August 1977;

"Preparation of Magnesium Hydride", *Russian Journal of Inorganic Chemistry*, pp. 389-395, April 1961;

"The Reaction of Hydrogen with Alloys of Magnesium and Copper", *Inorganic Chemistry*, Vol. 6, No. 12, December 1967; and "The Reaction of Hydrogen with Alloys of Magnesium and Nickel and the Formation of $Mg_2NiH_4$", *Inorganic Chemistry*, Vol. 7, No. 11, November 1967.

A disadvantage of magnesium alloys for the purposes described is that the magnesium alloys are comparatively costly since they must be prepared by smelting the elements, casting the resulting melt, comminuting the cast body and milling the comminuted product to a fine powder capable of absorbing hydrogen rapidly.

It has also been proposed to provide catalysts for an increase in the reaction rate of hydrogen with the magnesium powder. Such catalysts can be organic compounds, generally organohalides or metals or alloys, especially titanium, vanadium, $LaNi_5$ and TiFe, which are known to react readily with hydrogen to form respective hydrides as is described in French application No. 75 28 647.

Such catalysts are additives whose use may be incompatible with industrial exploitation of magnesium-based hydrogen storage systems for industrial purposes and, naturally, increase the cost of the system and may introduce factors which affect the reliability of magnesium as a hydrogen storage metal.

OBJECTS OF THE INVENTION

It is the principal object of the present invention to provide a composition for the storage of hydrogen by the reversible formation of magnesium hydride which eliminates the disadvantages of earlier systems and which is capable of absorbing hydrogen rapidly without excessive temperatures and pressures, which can have a relatively high capacity for the hydrogen in the form of the hydride and which is capable of a high degree of desorption or regeneration of the hydrogen.

Another object of the invention is to provide a magnesium-based composition for the purposes described which can be transformed in major part to the hydrogen-storing hydride and which maintains its high hydrogen capacity for a large number of hydrogen absorption/regeneration cycles.

It is also an object of this invention to provide an improved method of making a magnesium-based composition for the storage and release of hydrogen.

SUMMARY OF THE INVENTION

These objects and others which will become apparent hereinafter are attained, in accordance with the present invention, with a composition for the storage and regeneration of hydrogen which comprises an intimate pulverulent mixture of magnesium powder and a separating agent homogeneously distributed throughout the composition and intermixed with the magnesium powder, in the form of an inert second powder which can be present in an amount of 1 to 20% by volume of the magnesium powder.

The powder forming the separating agent is inert with respect to magnesium, hydrogen and magnesium hydride in the sense that it does not combine with magnesium or magnesium hydride and does not interfere with the transformation of the magnesium powder to the hydride or the decomposition of the hydride to magnesium and hydrogen under the conditions utilized for the formation of and the decomposition of magnesium hydride.

The separating agent powder is physically stable and inhibits the agglomeration of the magnesium powder so that the same retains its original subdivided state and specific surface area for numerous successive absorption/desorption cycles for the storage and regeneration of gaseous $H_2$.

According to another aspect of the invention, the composition is formed by conjointly grinding or milling magnesium powder with the separating agent in the form of a powder which is inert to hydrogen and magnesium and is physically stable under the temperature and pressure conditions necessary for the formation and decomposition of magnesium hydride thereby forming the pulverulent intimate mixture in which the separating agent is distributed uniformly in the composition and in an intermingled relationship with the magnesium powder.

Naturally, the invention also relates to the product made by this process and to a method of storing which comprises forming the pulverulent mixture described above, subjecting the resulting mixture to hydrogen contact with gaseous hydrogen at a pressure and temperature sufficient to transform substantially all of the magnesium of the mixture to magnesium hydride, retaining the mixture in which the magnesium has been transformed predominantly into the magnesium hydride under storage for an appropriate time, and subjecting the mixture thereafter to temperature and pressure conditions whereby the magnesium hydride is thermally decomposed and gaseous hydrogen is released therefrom. Generally speaking the process from contact of the mixture with hydrogen to regeneration of the hydrogen will be repeated over a multiplicity of successive storage and regeneration cycles.

It has been found that a relatively large number of materials can be used as separating agents in accordance with the invention and with the definition given above, these materials being generally incapable of forming hydrides with hydrogen under the conditions necessary for the formation of $MgH_2$ and being nonreactive with the magnesium under the same conditions. These materials include:

- as elemental metals—manganese, iron, cobalt, nickel and copper;
- as metal alloys—iron-zinc alloys and alloys containing one or more of the above-mentioned elemental metals and one or more of these metals apart from iron in alloying relationship with the iron-zinc alloy; and
- as compounds—the oxides, carbides or nitrides of magnesium, calcium, boron, aluminum, silicon, titanium, zirconium, chromium, manganese and iron.

Naturally, a combination of two or more such separating agents may be used as well and, for any particular industrial application, one can choose from among the above-given class separating agents which do not interfere with the particular industrial process to which the hydrogen is to be transferred or in which the composition is utilized.

Since the separating additive does not participate in the storage of hydrogen it is advantageous to keep the amount of it in the composition as low as possible so that the proportion of the composition constituted by the convertible magnesium is as high as possible. Thus the minimum quantity of the separating powder which will prevent agglomeration and reduction and the surface activity of the magnesium should be used. Experience has shown that the separating agent should be present in an amount of 1 to 20% by volume of the magnesium powder so that the magnesium powder constitutes the preponderant component in the composition.

While the mechanism of the present invention is not certain, experience has shown that when magnesium particulates alone (without catalyst or separating agent) are obtained in a relatively hard state, for example from the machining of magnesium billets, it is possible to hydrogenate them at 400° C. and 30 bar in about 15 hours for complete transformation to $MgH_2$. The quantity of hydrogen absorbed corresponds to about 7.4% (by weight of the magnesium). In order to desorb the hydrogen and recover the latter in a gaseous state from the magnesium, one subjects the magnesium hydride to thermal decomposition at a temperature in excess of 300° C.

The thermal decomposition of the $MgH_2$ appears to reduce the degree of hardness of the magnesium and bring about a certain degree of inter-particle fusion (fritting or sintering) which considerably reduces for subsequent cycles the storage capacity, e.g. 3 to 4% (by weight of the magnesium) or about half the initial capacity of about 7.4% resulting from the initial hydrogenation of the magnesium agent.

However, when the pulverulent agent of the present invention is added to the magnesium, this fritting or sintering is eliminated and, when the composition is prepared by grinding the two powders together, it is possible to obtain the extremely intimate mixture required to preclude loss of surface activity and at the same time to obtain a highly subdivided state and hardness of the magnesium to facilitate the initial hydrogenation and transformation to $MgH_2$. Since the separating agent is used in small quantities and is essentially inert to the hydrogen it does not materially reduce the storage capacity of the composition while maintaining the storage capacity of the magnesium component which otherwise would be lost in the manner described.

Both hydrogenation and dehydrogenation occur with their original velocities, unimpeded by agglomeration of the magnesium particles. The composition has thus been found to allow, probably for the first time, the effective large-scale use of magnesium powder with exceptional efficiency in the storage and regeneration of gaseous hydrogen over a large number of cycles without significant loss in efficiency.

BRIEF DESCRIPTION OF THE DRAWING

The above and other objects, features and advantages of the present invention will become more readily apparent from the following description and specific examples, reference being made to the accompanying drawing in which.

SPECIFIC DESCRIPTION AND EXAMPLES

EXAMPLE 1

An intimate pulverulent mixture of magnesium and iron (hereinafter referred to as the mixture Mg-Fe) is prepared by grinding 25 g of magnesium powder in the form of fine magnesium turnings (marketed under the name "FLUKA" 63040) with a particle size range between 200 and 50 microns concurrently with 2.5 g of iron powder having a mean particle size of 10 microns. The simultaneous grinding is carried out for a period of 72 hours in a ball mill using balls of a hard metal to produce a very uniform pulverulent Mg-Fe mixture.

This mixture is subjected to activation in an autoclave adapted to sustain the temperature and pressure conditions for absorption and desorption of hydrogen. The mixture is thus subjected to degassing for a period of 30 minutes at 350° C. under a primary vacuum of $10^{-2}$ torr.

The absorption phase is effected by introducing hydrogen at a pressure of 30 bar into the autoclave which is maintained at a temperature of 350° C. to 400° C. and in 15 hours hydrogenation is complete with substantially stoichiometric conversion of the magnesium to $MgH_2$. A precise weighing of the contents of the autoclave shows that the hydrogen pickup corresponds to a molar conversion of $MgH_2/Mg$ of 0.974.

The dehydrogenation or desorption phase is effected by reducing the pressure from 30 bar (during storage) to 1 bar and maintaining the temperature at 350° C. until the $MgH_2$ is completely decomposed. The $MgH_2$ is completely converted to magnesium (with evolution of $H_2$) in about 60 minutes. When the temperature is raised to 400° C., the desorption time can be reduced to about 30 minutes.

After this activation of the magnesium, samples of the mixture were subjected to three series of tests, each involving 10 absorption/desorption cycles in the manner described above and the conversion ratio as a function of the time for absorption of hydrogen was plotted for each system after the tenth cycle. During the three series of tests, the Mg-Fe mixture was subjected to pressures of 30 bar, 20 bar and 10 bar during the respective absorption (temperature of 350° C.–400° C.) with desorption at 350° C. and 1 bar. The three series of tests are represented on the graphs by Mg-Fe 30, Mg-Fe 20 and Mg-Fe 10, respectively, the figures 30, 20 and 10 representing for this example and those which follow the absorption pressures.

As a basis for comparison, a fourth series of tests was carried out with an equivalent quantity of the same magnesium powder, without addition of iron, i.e. with 27.5 g of magnesium powder identical to that utilized in the mixture and subjected to the same type of activation as was the mixture. The results of this fourth series of tests are identified at Mg 40 on the graphs.

Figure 1:
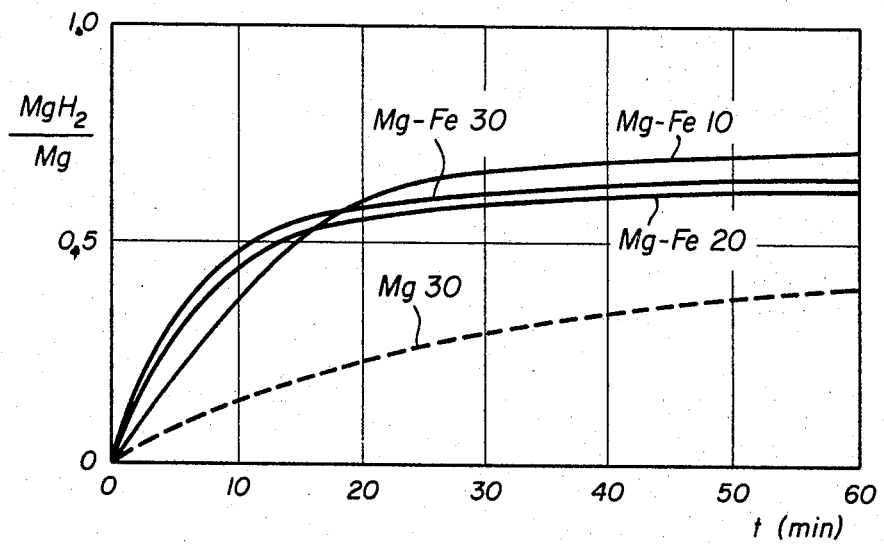
FIGS. 1 through 6 are graphs in which the molar ratio $MgH_2/Mg$ is plotted along the ordinate and time is plotted along the abscissa for systems corresponding to Examples 1 through 6 infra.

FIG. 1 shows the experimental curves corresponding to the fourth series of tests in broken lines, and in solid lines the results obtained with the mixtures.

As is clear from the curve Mg 30, the magnesium powder alone after 10 cycles has a conversion ratio $MgH_2/Mg$ of 0.3 after 30 minutes and 0.4 in 60 minutes for absorption of hydrogen. The storage capacity corresponds respectively to 2.3 and 3.04% hydrogen (by weight of magnesium) which can be contrasted with the 7.4% initial value discussed previously.

The curve Mg-Fe 30 indicates a far more rapid and complete absorption of hydrogen such that the conversion ratio $MgH_2/Mg$ has a value of 0.6 in 30 minutes and 0.65 in 60 minutes (after 10 cycles), the storage capacity after one hour at 30 bar being 4.5% hydrogen absorbed (by weight of the Mg-Fe mixture).

The Mg-Fe 10 curve demonstrates that a reduced hydrogenation pressure of 10 bar during the absorption permits higher conversion ratios to be obtained, corresponding to 0.65 in 30 minutes and 0.73 in 60 minutes. The storage capacity after an hour at 10 bar is about equal to 5% hydrogen absorbed (by weight of the mixture Mg-Fe).

EXAMPLE 2

A pulverulent mixture of magnesium and cobalt (Mg-Co) was prepared and treated in the manner described in Example 1 by grinding 25 g of the same magnesium powder with 2.5 g cobalt powder having a mean particle size of 100 microns.

After activation in the manner described in Example 1, the mixture Mg-Co was subjected to three series of tests, each involving 10 absorption/desorption cycles in which absorption of hydrogen was also effected at 350° to 400° C., the pressure of hydrogen on absorption being maintained at 30 bar, 20 bar and 10 bar, respectively, during the three series of cycles. The ratio of conversion $MgH_2/Mg$ was in addition determined periodically for an hour of absorption in each cycle.

Figure 2:
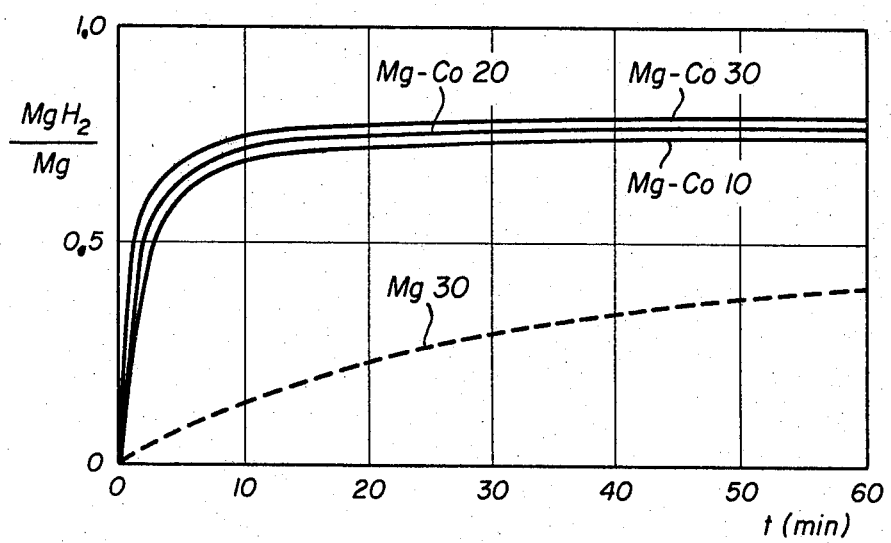

FIG. 2 illustrates the three experimental curves corresponding to Mg-Co 30, Mg-Co 20 and Mg-Co 10, as well as the curve 30 already described in Example 1.

According to curve Mg-Co 30, the conversion ratio $MgH_2/Mg$ is 0.70 after 30 minutes and 0.78 after 60 minutes. The storage capacity after one hour of absorption under 30 bar corresponds to 5.4% hydrogen (by weight of the mixture Mg-Co) after 10 cycles absorption/desorption, which is about twice the corresponding capacity shown by the curve Mg 30 for the magnesium powder alone.

Absorption of hydrogen can be effected under a pressure ranging from 30 to 10 bar without noticeably affecting the storage capacity of the mixture Mg-Co, thus allowing effective utilization of this mixture at a relatively low pressure.

Another series of comparative tests has in addition shown that absorption of hydrogen under 30 bar but at a temperature of 300° C. allowed the same mixture Mg-Co to attain in 20 minutes the conversion ratio $MgH_2/Mg$ of 0.76 corresponding to a storage capacity of 5.2% hydrogen (by weight of the mixture Mg-Co).

Consequently, the mixture Mg-Co can be used to absorb hydrogen at a temperature of only 300° C. and/or under the relatively low pressure of 10 bar while ensuring the advantages described above regarding the more rapid and complete absorption of hydrogen in magnesium.

EXAMPLE 3

A pulverulent mixture of magnesium and nickel (Mg-Ni) was prepared and treated in the manner described in Example 1 by grinding 25 g of the magnesium powder described in that example with 2.5 g nickel having a mean particle size of 5 microns.

Figure 3:
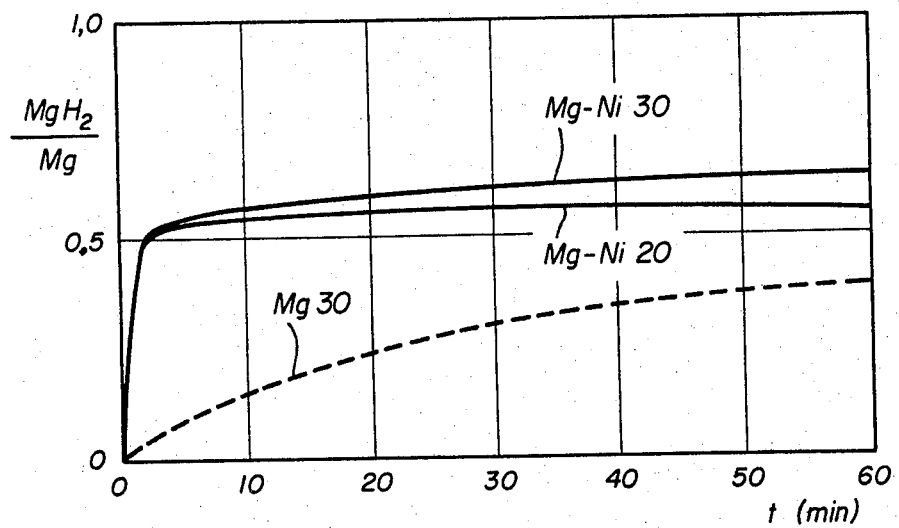

After activation carried out as described in Example 1, the mixture was subjected to a series of tests; the results of these tests are shown by curve Mg-Ni 30 in FIG. 3 indicating that:

The mixture Mg-Ni reaches the conversion ratio $MgH_2/Mg$ of about 0.5 in 2 minutes and 0.55 in 10 minutes and then shows little increase during a course of 1 hour.

The mixture of powder Mg-Ni can thus attain in 10 minutes the storage capacity of 4% hydrogen (by weight of mixture Mg-Ni) and this storage capacity remains constant at least during 10 subsequent absorption/desorption cycles.

By comparison, according to the curve Mg 30, the magnesium powder alone (without any additives) absorbs hydrogen much more slowly and in a smaller quantity, e.g. 3% hydrogen (by weight of magnesium) in 1 hour as compared to 4% hydrogen (by weight of the pulverulent mixture Mg-Ni) in 10 minutes.

The mixture Mg-Ni obtained in accordance wih the present invention can therefore absorb hydrogen more rapidly than the mixture Mg-Fe as shown in Example 1 but less completely than the mixture Mg-Co as shown in Example 2.

EXAMPLE 4

A pulverulent mixture of magnesium and copper (Mg-Cu) was prepared and treated in the manner described in Example 1 by grinding 25 g of the magnesium as described with 2.5 g of copper powder having a mean particle size of 25 microns.

Figure 4:
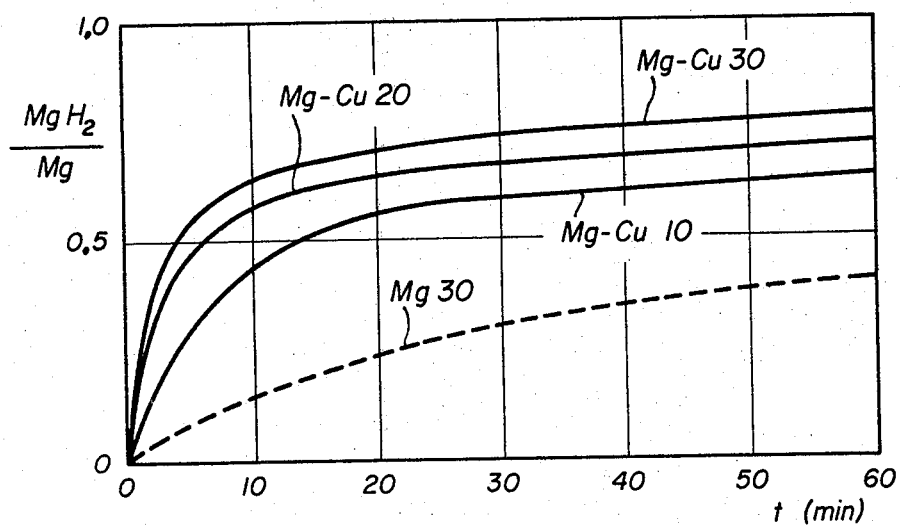

The four curves in FIG. 4 illustrate the following:

Curve Mg-Cu 30 represents the molar conversion $MgH_2/Mg$ of about 0.5 in 4 minutes, 0.75 in 30 minutes and 0.78 in 60 minutes.

The storage capacity attained in 1 hour of hydrogen absorption (under 30 bar) by the mixture Mg-Cu corresponds to 5.3% and otherwise remains constant in at least 10 successive absorption/desorption cycles.

Hydrogen absorption is thus more rapid and complete in the mixture Mg-Cu than in the magnesium powder alone (curve 30, FIG. 4).

As is clear from the curves Mg-Cu 20 and Mg-Cu 30, a lowering of the pressure to 20 and 10 bar corresponds as well to a more rapid and complete absorption of hydrogen in this mixture than in the magnesium powder alone under 30 bar (curve Mg 30, FIG. 4).

In addition, the above mixture Mg-Cu was subjected to tests of similar cycles, in which absorption was effected under 30 bar but with temperature reduced to 300° C. These tests allow reversible storage of 5% hydrogen (by weight of the mixture Mg-Cu), i.e. the storage capacity lowered very little, from 5.3% to 5%.

The mixture Mg-Cu can thus be used for absorption of hydrogen under noticeably reduced pressure, within 30 and 10 bar (or even less), and/or at a temperature between 350° C. and 300° C. while allowing a more rapid and more complete absorption than is the case of magnesium alone.

EXAMPLE 5

A pulverulent mixture of magnesium, iron and zinc (Mg-ZnFe) was prepared and treated in the manner described in Example 1 by grinding 25 g of the magnesium as described in that example and 2.5 g of the powder of an equiatomic Zn-Fe alloy, having the composition Zn-Fe and a mean particle size of 50 microns.

The mixture of Mg-ZnFe was subjected to an activation as described in Example 1, then to repeated absorptions (under 30 bar, at a temperature of 350° C.) in a series of 10 absorption/desorption cycles.

Figure 5:
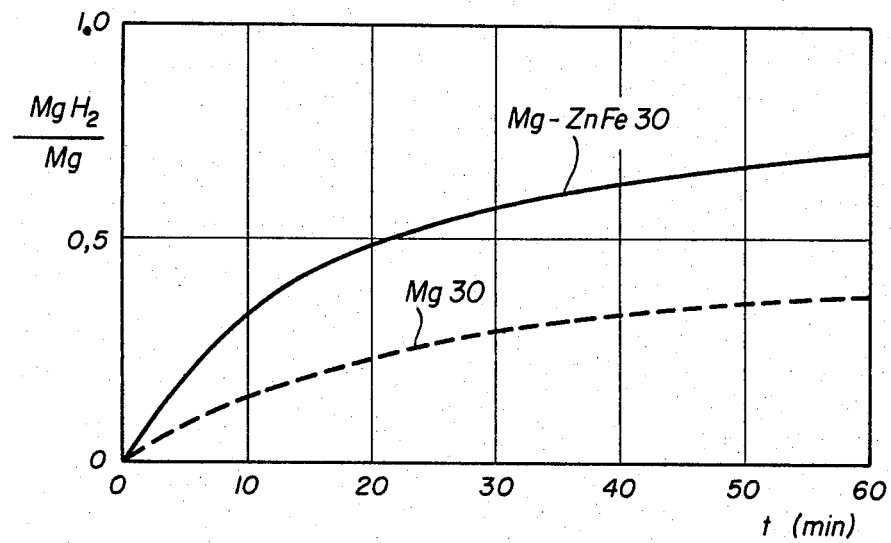

FIG. 5 shows the corresponding curve Mg-ZnFe 30 and the curve Mg 30 already described from which the following can be seen:

It is clear from curve Mg-ZnFe 30 that the molar conversion ratio $MgH_2/Mg$ reaches 0.5 in 30 minutes and 0.66 in 60 minutes.

The storage capacity attained in 1 hour of hydrogen absorption (under 30 bar, at a temperature of 350° C.) by the mixture Mg-ZnFe corresponds thus to 5% and remains otherwise constant in at least 10 successive absorption/desorption cycles.

Hydrogen absorption is thus more rapid and complete in the case of the mixture Mg-ZnFe than in the case of magnesium alone (curve 30, FIG. 5).

EXAMPLE 6

A pulverulent mixture of magnesium and silicon carbide (Mg-SiC) was prepared and treated in the manner described in Example 1 by grinding 25 g of magnesium as described in that example with 2.5 g of silicon carbide powder having a mean micron size of 200.

After carrying out the activation as described in Example 1, the mixture Mg-SiC is subjected to two series of 10 absorption/desorption cycles in which absorption of hydrogen is effected at 350° to 400° C., the pressure of hydrogen during the absorption was maintained at 50 bar in one series of cycles and at 30 bar in the other series, and the ratio $MgH_2/Mg$ was determined in the course of 1 hour of absorption.

Figure 6:
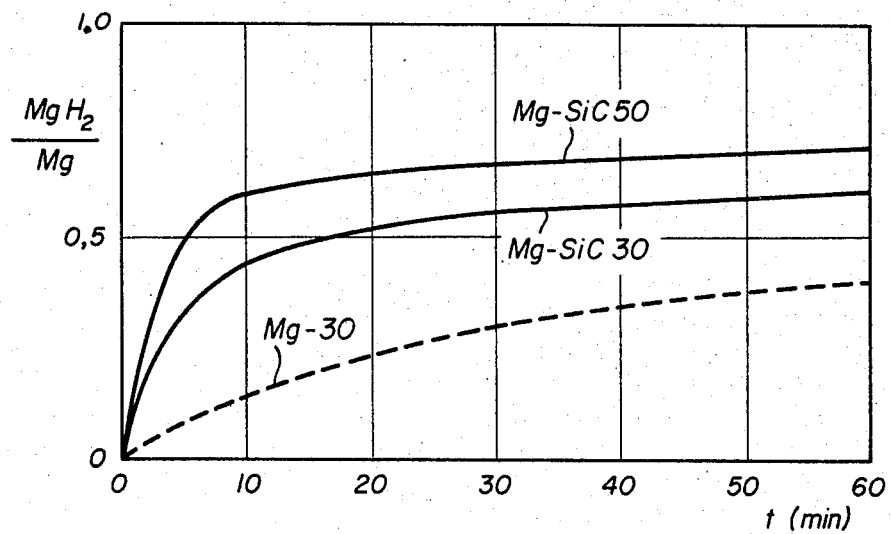

FIG. 6 shows the respective experimental curves Mg-SiC 50 and Mg-SiC 30, as well as the curve Mg 30 already described. The following is clear from the curves:

According to curve Mg-SiC 30 the ratio $MgH_2/Mg$ rises to 0.58 in 30 minutes and to 0.61 in 1 hour of absorption (under 30 bar, at 350° C.).

The storage capacity which is thus reached in 1 hour corresponds to 4.2% of hydrogen (by weight of the mixture Mg-SiC) and remains otherwise constant in the course of 10 cycles of this series under 30 bar.

The results represented by the curve Mg-SiC 50 show that absorption of hydrogen is even more rapid and more complete at 50 bar than under 30 bar (curve Mg-SiC 30).

The absorption of hydrogen effected during these cycles on the mixture Mg-SiC is thus much more rapid and complete than in the case of magnesium alone.

I claim:

1. A composition for the storage of hydrogen which consists of a pulverulent intimate mixture of magnesium powder and between 1 and 20% by volume thereof of a separator-agent powder inert to hydrogen and magnesium under hydrogen absorption and desorption conditions, said separator-agent powder being uniformly distributed in said mixture, being physically stable and inhibiting agglomeration of the magnesium powder over a succession of absorption/desorption cycles whereby the magnesium powder is converted to magnesium hydride and hydrogen is released upon thermal decomposition of the hydride respectively.

2. The composition defined in claim 1 wherein said separator-agent powder is composed of at least one of the metals selected from the group consisting of manganese, iron, cobalt, nickel and copper or an alloy thereof inert to hydrogen and magnesium under hydrogen absorption and desorption conditions.

3. The composition defined in claim 2 wherein the separator-agent powder is a primary alloy inert to hydrogen and magnesium under hydrogen absorption and desorption conditions.

4. The composition defined in claim 1 wherein said separator-agent powder is composed of at least one oxide, carbide or nitride of magnesium, calcium, boron, aluminum, silicon, titanium, zirconium, vanadium, chromium, manganese, iron or a combination thereof.

5. A process for producing a magnesium-based composition adapted to absorb hydrogen under predetermined absorption conditions and form magnesium hydride and adapted, upon thermal decomposition of said magnesium hydride, to release gaseous hydrogen, said process consisting of the steps of conjointly grinding magnesium powder and a powder of a separator agent inert to hydrogen and magnesium, physically stable under said conditions and adapted to prevent agglomeration of the magnesium powder during absorption/desorption cycling of the composition.

6. The process defined in claim 5 wherein said separator-agent powder is composed of at least one of the metals selected from the group which consists of manganese, iron, cobalt, nickel and copper or an alloy thereof inert to hydrogen and magnesium under hydrogen absorption and desorption conditions.

7. The process defined in claim 6 wherein said separator-agent powder is a primary alloy of one of said metals inert to hydrogen and magnesium under hydrogen absorption and desorption conditions.

8. A composition for the storage of hydrogen which consists of a pulverulent intimate mixture of magnesium powder and between 1 and 20% by volume thereof of a primary iron-zinc alloy separator-agent powder inert to hydrogen and magnesium under hydrogen absorption and desorption conditions, said separator-agent powder being uniformly distributed in said mixture, being physically stable and inhibiting agglomeration of the magnesium powder over a succession of absorption/desorption cycles whereby the magnesium powder is converted to magnesium hybride and hydrogen is released upon thermal decomposition of the hydride respectively.

9. A process for producing a magnesium-based composition adapted to absorb hydrogen under predetermined absorption conditions and form magnesium hydride and adapted, upon thermal decomposition of said magnesium hydride, to release gaseous hydrogen, said process comprising the steps of conjointly grinding magnesium powder and a powder of a separator agent in the form of a primary iron-zinc alloy.

* * * * *